US012141428B2

(12) United States Patent
Gupta et al.

(10) Patent No.: US 12,141,428 B2
(45) Date of Patent: Nov. 12, 2024

(54) SYSTEM AND METHOD FOR SAVING HISTORY INFORMATION FOR VIEW PARAMETER DATA

(71) Applicant: Rakuten Symphony, Inc., Tokyo (JP)

(72) Inventors: Rohit Gupta, Indore (IN); Sandeep Parmar, Indore (IN); Prateek Chouhan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/908,144

(22) PCT Filed: Aug. 1, 2022

(86) PCT No.: PCT/US2022/039042
§ 371 (c)(1),
(2) Date: Aug. 30, 2022

(87) PCT Pub. No.: WO2024/030112
PCT Pub. Date: Feb. 8, 2024

(65) Prior Publication Data
US 2024/0231588 A1 Jul. 11, 2024

(51) Int. Cl.
*G06F 3/04847* (2022.01)
*G06F 9/445* (2018.01)

(52) U.S. Cl.
CPC ...... *G06F 3/04847* (2013.01); *G06F 9/44505* (2013.01)

(58) Field of Classification Search
CPC ................................................ G06F 3/048–05
See application file for complete search history.

(56) References Cited

U.S. PATENT DOCUMENTS

2003/0154197 A1* 8/2003 Millet .................. G06F 16/284 707/999.009
2004/0054625 A1* 3/2004 Kellogg ................. G06Q 20/40 705/41
2006/0212487 A1* 9/2006 Kennis .................. G06Q 40/00
2010/0077464 A1* 3/2010 Hardy-McGee ....... G06Q 10/06 715/742

(Continued)

OTHER PUBLICATIONS

Written Opinion of The International Searching Authority dated Dec. 6, 2022 in International Application No. PCT/US22/39042.

(Continued)

*Primary Examiner* — Daniel Rodriguez
(74) *Attorney, Agent, or Firm* — Sughrue Mion, PLLC

(57) ABSTRACT

A system for saving history information of input data to parameters included in a view is provided. The system includes a processor configured to: output an instance of the view; obtain pre-stored view details for the view, including identifiers of the parameters and tables to which input data of the parameters included are to be stored; make a generic API call to save current input data of a parameter to a table, wherein an input to the API call includes the current input data and old data of the parameter; based on the current input data and the old data being different, store the current input data in the table, create history information of the current input data and store the history information in a history table.

20 Claims, 12 Drawing Sheets

100

Output instance of current view, receive input data — S110

Obtain view details for current view — S120

Execute save data API call for saving input data to one or more tables — S130

Compare current input data with prior data of view parameters for output instance — S140

Store current input data that is different from old data in one or more tables — S150

Generate and store history information for current input data — S160

(56) References Cited

U.S. PATENT DOCUMENTS

| | | | | |
|---|---|---|---|---|
| 2011/0191303 | A1* | 8/2011 | Kaufman | G06F 7/00 707/684 |
| 2011/0321010 | A1* | 12/2011 | Wang | G06F 9/449 717/116 |
| 2014/0280026 | A1* | 9/2014 | Anderson | G06F 16/211 707/769 |
| 2019/0102386 | A1* | 4/2019 | Bell | G06F 16/2474 |
| 2020/0073926 | A1* | 3/2020 | Qian | G06F 8/34 |
| 2020/0201689 | A1* | 6/2020 | Laethem | G06F 9/451 |

OTHER PUBLICATIONS

International Search Report dated Dec. 6, 2022 in International Application No. PCT/US22/39042.

* cited by examiner

FIG. 4A

```
{
  "wrapperList":[
    {
      "instanceOf":"MrfAttStructureDetails",
      "relation":"Parent",
      "sequence":"MrfAttStructureDetails-1",
      "stringJson":{
        "creationTime":1651042510000,
        "creatorId":27715,
        "creatorName":"Test PU",
        "lastModifierName":"Test PU",
        "latitudeDecimalFormat":41.790782,
        "modificationTime":1651042536008,
        "heightUpdate":"Yes",
        "lastModifierId":27715,
        "id":2040,
        "latitudeNAD83DMSFormat":"41°47'26.75\"N",
        "longitudeNAD83DMSFormat":"87°34'10.55\"W",
        "entityId":"PCB-332",
        "onTribalLands":"No",
        "longitudeDecimalFormat":-87.58293
      }
    },
    {
      "instanceOf":"RaeProjectDetails",
      "relation":"Parent",
      "sequence":"RaeProjectDetails-1",
      "stringJson":{…},
      "gridName":""
    }
  ],
```

```
"oldData":[
  {
    "fieldNameValue":{
      "creationTime":1651042018000,
      "creatorId":37715,
      "creatorName":"Test PC",
      "lastModifierName":"Test PC",
      "latitudeDecimalFormat":41.798763,
      "modificationTime":1651042526000,
      "heightUpdate":"No",
      "lastModifierId":37715,
      "id":7040,
      "latitudeNAD83DMSFormat":"41°47'26.75\"N",
      "longitudeNAD83DMSFormat":"-87°46'58.55\"W",
      "entityId":"PCN-332",
      "onTribalLands":"No",
      "longitudeDecimalFormat":-87.78293
    },
    "instanceOf":"NrfArtStructureDetails",
    "relation":"Parent",
    "sequence":"NrfArtStructureDetails-1",
    "primaryKeyName":"id",
    "primaryKeyValue":"7040"
  },
  {
    "fieldNameValue":{...},
    "instanceOf":"RaaProjectDetails",
    "relation":"Parent",
    "sequence":"RaaProjectDetails-1",
    "primaryKeyName":"id",
    "primaryKeyValue":"5583"
  }
],
"entityRelation":{
  "PROJECT":"PCN-332",
  "SITE":"930001-898001",
  "PROJECTTASK":"PCN-332-1651042508043",
  "entityName":"Capture NW SOW",
  "entityType":"TASK",
  "entityId":"PCN-332-1651042508003",
  "applicationName":"CIMS",
  "identifier1":"PCN",
  "identifier2":"VLKRPO30-12345",
  "identifier3":"930001-898001",
  "identifier4":"PCN-332"
},
"viewName":"capturenwsow_pcn",
```

420

430

Figure 6A:
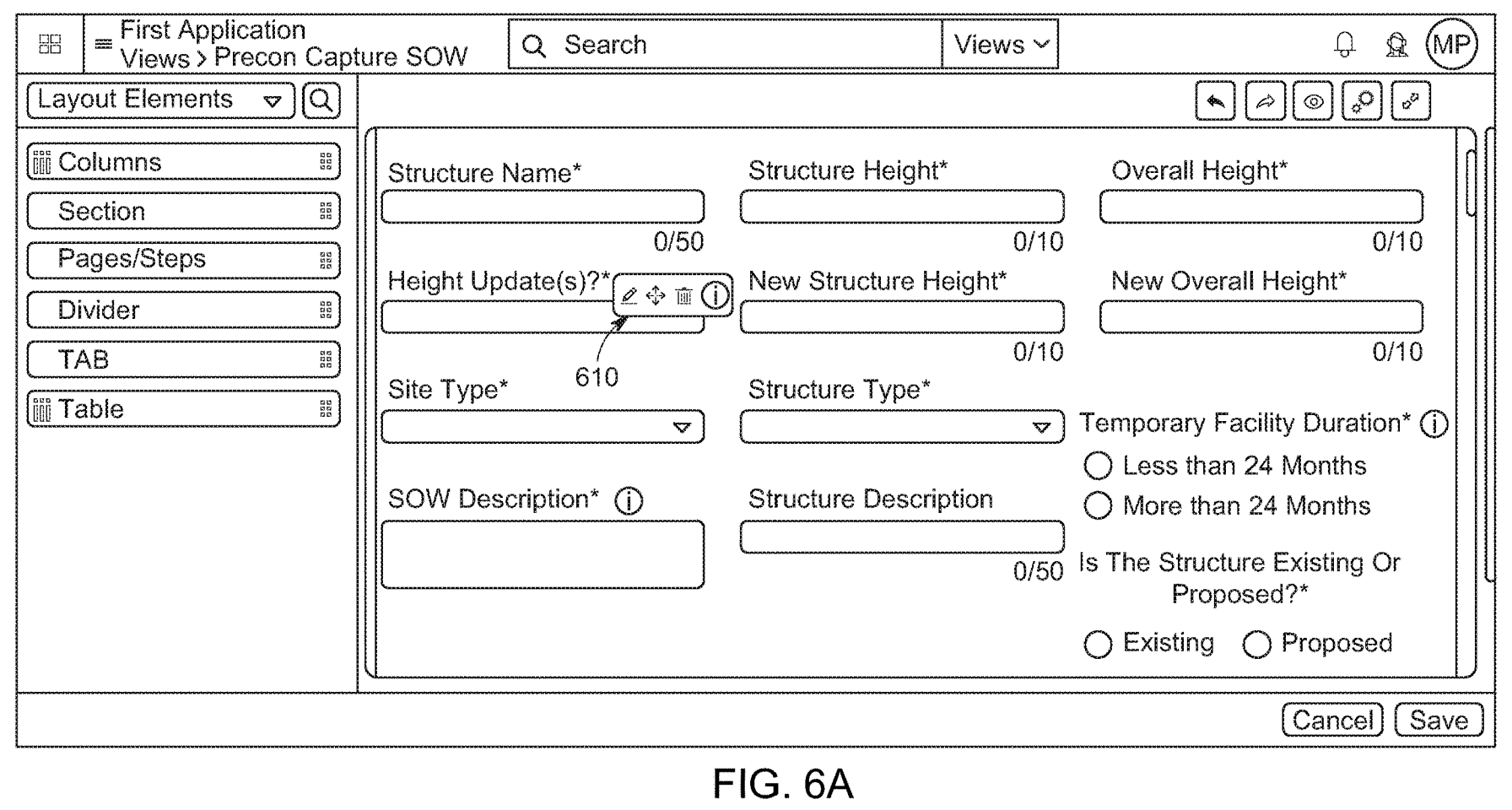

First Application
Views > Precon Capture SOW
Search
Views
MP
Layout Elements
Columns
Section
Pages/Steps
Divider
TAB
Table
Structure Name*
0/50
Structure Height*
0/10
Overall Height*
0/10
Height Update(s)?*
New Structure Height*
0/10
New Overall Height*
0/10
610
Site Type*
Structure Type*
Temporary Facility Duration*
Less than 24 Months
More than 24 Months
SOW Description*
Structure Description
0/50
Is The Structure Existing Or Proposed?*
Existing
Proposed
Cancel
Save

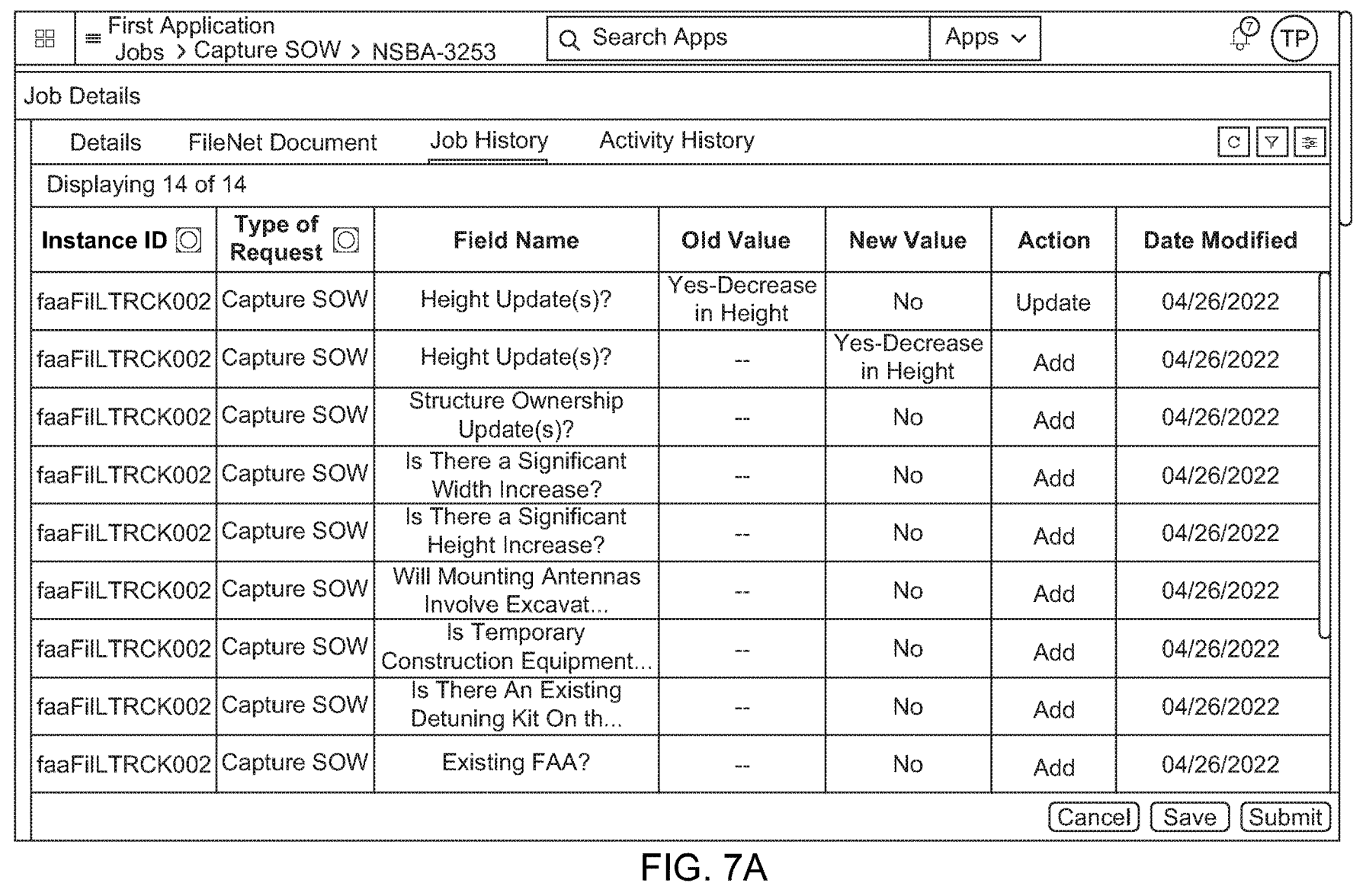

First Application
Jobs > Capture SOW > NSBA-3253
Search Apps
Apps
TP

Job Details

Details FileNet Document Job History Activity History

Displaying 14 of 14

| Instance ID | Type of Request | Field Name | Old Value | New Value | Action | Date Modified |
|---|---|---|---|---|---|---|
| faaFilLTRCK002 | Capture SOW | Height Update(s)? | Yes-Decrease in Height | No | Update | 04/26/2022 |
| faaFilLTRCK002 | Capture SOW | Height Update(s)? | -- | Yes-Decrease in Height | Add | 04/26/2022 |
| faaFilLTRCK002 | Capture SOW | Structure Ownership Update(s)? | -- | No | Add | 04/26/2022 |
| faaFilLTRCK002 | Capture SOW | Is There a Significant Width Increase? | -- | No | Add | 04/26/2022 |
| faaFilLTRCK002 | Capture SOW | Is There a Significant Height Increase? | -- | No | Add | 04/26/2022 |
| faaFilLTRCK002 | Capture SOW | Will Mounting Antennas Involve Excavat... | -- | No | Add | 04/26/2022 |
| faaFilLTRCK002 | Capture SOW | Is Temporary Construction Equipment... | -- | No | Add | 04/26/2022 |
| faaFilLTRCK002 | Capture SOW | Is There An Existing Detuning Kit On th... | -- | No | Add | 04/26/2022 |
| faaFilLTRCK002 | Capture SOW | Existing FAA? | -- | No | Add | 04/26/2022 |

Cancel Save Submit

FIG. 7A

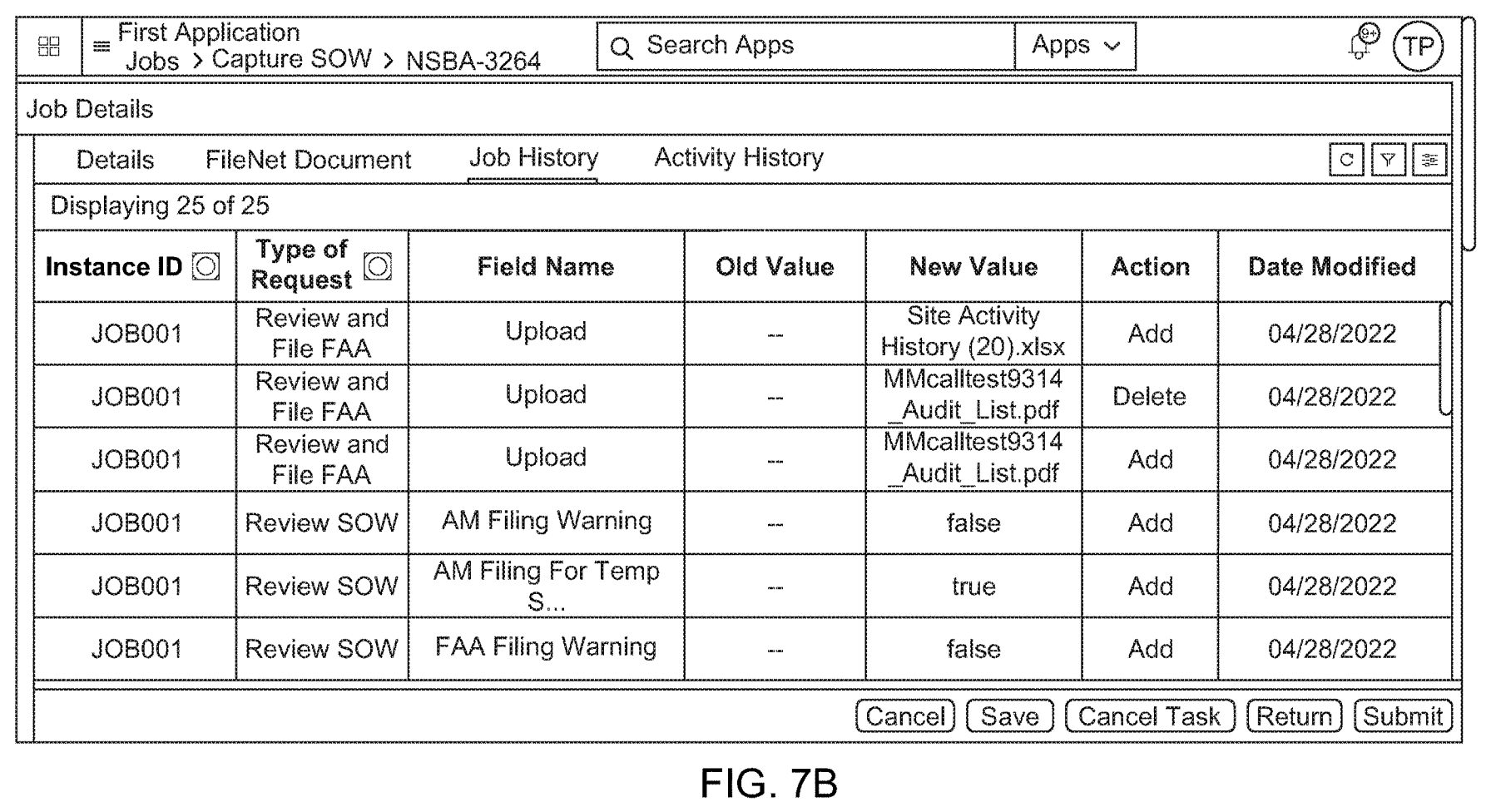

First Application
Jobs > Capture SOW > NSBA-3264

Search Apps

Apps

TP

Job Details

Details FileNet Document Job History Activity History

Displaying 25 of 25

| Instance ID | Type of Request | Field Name | Old Value | New Value | Action | Date Modified |
|---|---|---|---|---|---|---|
| JOB001 | Review and File FAA | Upload | -- | Site Activity History (20).xlsx | Add | 04/28/2022 |
| JOB001 | Review and File FAA | Upload | -- | MMcalltest9314 _Audit_List.pdf | Delete | 04/28/2022 |
| JOB001 | Review and File FAA | Upload | -- | MMcalltest9314 _Audit_List.pdf | Add | 04/28/2022 |
| JOB001 | Review SOW | AM Filing Warning | -- | false | Add | 04/28/2022 |
| JOB001 | Review SOW | AM Filing For Temp S... | -- | true | Add | 04/28/2022 |
| JOB001 | Review SOW | FAA Filing Warning | -- | false | Add | 04/28/2022 |

Cancel Save Cancel Task Return Submit

FIG. 7B

SYSTEM AND METHOD FOR SAVING HISTORY INFORMATION FOR VIEW PARAMETER DATA

CROSS REFERENCE TO RELATED APPLICATIONS

This application is a National Stage of International Application No. PCT/US2022/039042 filed on Aug. 1, 2022.

BACKGROUND

Databases may be used to store data for a variety of applications. For example, in business environments, databases may be used to store and manage job information, employee information, site information, and other related data for an application. The data may be input and/or viewed via different user interface views that store and/or fetch the data to/from the database tables.

A related art view building application may generate and configure different views for one or more other applications in an application platform (e.g., a cloud-based application platform for an enterprise or business). Each view corresponds to a screen, form, user interface, or page through which data may be input to respective fields (i.e., parameters) of the view and stored in one or more databases or tables of the one or more other applications, and/or data may be fetched from the one or more databases or tables and output for display on respective fields of the view. The related art view building application allows a user to generate or modify a view by configuring the fields to be included in the view, from among previously-registered fields corresponding to backend resource fields (e.g., database table columns) of the one or more other applications.

When a particular view is loaded for outputting data previously-stored (e.g., previously input) in one or more tables, the related art view building application must execute application programming interface (API) calls customized or written for that view. As a result, any change to the fields in the view requires changes in the APIs developed for the view to fetch resource data for the respective fields. In other words, if the view is modified to include one or more additional fields, then a custom API must be developed to fetch the resource data for the view.

Similarly, when a user wants to input data into a view (e.g., form), an instance (corresponding to a particular record) of the view is displayed on a view user interface (UI) screen (e.g., a view UI of a corresponding application for which the view is created). The user can then manually input data into the respective fields of the displayed view, and save the view data into the backend table(s) that include columns corresponding to the respective view fields. This process can be repeated any number of times to create plural instances or records for a particular view. For example, where a task is to be performed multiple times on a particular process, a form (or view) may be filled out each time the task is performed and the corresponding input data may be stored in the backend table(s).

Pursuant to the above-described loading and saving processes for a view, a user may modify or replace previous (or old) input data with a new value by loading a previously-generated instance of a view and modifying the parameter data (i.e., the previously input resource data fetched and provided in the fields of the view). In the related art view UI, however, no generic mechanism exists for maintaining a history of the parameter data or values (i.e., a history of the old value and the current or new value for a particular view parameter). Further, no mechanism exists to dynamically and selectively configure which parameters will have their history information maintained. As a result, a user is unable to see history information for view parameters of a particular instance of a view, and cannot specify the view parameters of interest for which history information is relevant.

To the extent a developer sets out to integrate a history capturing function into a view UI, then such a function would have to be customized for each view, as each view includes different combinations of parameters. Moreover, if a view is later modified to include an additional field or parameter, then an additional custom API must be written to save the view data input to the additional field as well as capture the history information for that field. This increases code complexity and results in multiple API creation and integration into a view. Further, any changes to views in the related art view building application are time consuming and inconvenient to a user, due to the additional API customization and development that is required.

SUMMARY

According to embodiments, systems and methods are provided for generically integrating a history capturing function for values of view parameters into a view user interface (UI), thereby eliminating the need for multiple creation and integration of APIs to capture history info for a particular view UI.

According to embodiments, systems and methods are provided for integrating a generic history capturing function that is dynamically configurable by a user for capturing history information of user-specified parameters in a view, thereby improving user convenience at runtime without requiring hardcoding or development efforts to modify configurations for history capturing.

According to embodiments, a system for saving history information of input data to parameters included in a view, includes: at least one memory storing instructions; and at least one processor configured to execute the instructions to: output, by a first application, an instance of the view; obtain, by the first application based on an identifier of the view, prestored view details for the view, wherein the view details include identifiers of the parameters included in the view and identifiers of one or more tables to which input data of the parameters included in the view are to be respectively stored; make, by the first application, a save data application programming interface (API) call to save current input data of a parameter of the view to a table from among the one or more tables, wherein an input to the save data API call includes the identifiers of the one or more tables, the identifiers of the parameters, the current input data, and old data of the parameter; compare the current input data with the old data included in the input to the save data API call; based on the current input data and the old data being different according to the comparing, store the current input data in the table; and based on the current input data and the old data being different according to the comparing, create history information of the current input data and store the history information in a history table.

The at least one processor may be further configured to execute the instructions to: output a view configuration screen for modifying a configuration of the parameters of the view; receive a user input to modify a history setting of the parameter so as to enable a saving of a history of the parameter; and store the history setting in the view details.

The view details may further include a history setting for the parameter indicating whether an input history of the parameter is to be saved; and the at least one processor may be further configured to execute the instructions to create the history information based on a determination that the history setting for the parameter indicates that the input history of the parameter is to be saved.

The history information may include an identifier of the parameter, the old data, the current input data of the parameter, and a current date.

The at least one processor may be further configured to execute the instructions to output a history user interface for the instance of the view, the history user interface providing a list of history information for the parameters of the instance of the view.

The input to the save data API may include, for each of the one or more tables, a first JSON string including identifiers of the parameters and current data values for the parameters, and a second JSON string including identifiers of the parameters and old data values for the parameters.

The at least one processor may be further configured to execute the instructions to: obtain, based on the identifiers of the one or more tables, information of a second application, associated with the table, from resource information pre-registered in the first application, the resource information mapping applications to tables respectively associated with the applications; send, based on the obtained information of the second application, a request to the second application to store the current input data to the table associated with the second application; and store, by the second application, the current input data to the table, wherein the save data API is generic across the plurality of tables.

The at least one processor may be further configured to execute the instructions to obtain identifiers of one or more primary keys corresponding to the view; and the input to the save data API may further include the identifiers of the one or more primary keys, and one or more primary key values corresponding to the instance of the view.

The view details may be obtained from a table that maps views to corresponding parameters respectively included in the views.

The at least one processor may be further configured to execute the instructions to: make, by the first application, a get data API call for fetching old data of the parameters included in the view configured by the first application, wherein an input of the get data API call may include a view identifier corresponding to the view; obtain, in response to the get data API call, the view details for the view; send, based on the obtained view details, a request to a second application for the old data of the parameter, among the parameters, stored in the table associated with the second application, from among the one or more tables; and receive and display, on the instance of the view, the requested old data, wherein the get data API is generic across a plurality of views including a plurality of different parameters.

According to embodiments, a method, performed by at least one processor, for saving history information of input data to parameters included in a view, includes: outputting an instance of the view; obtaining, by a first application based on an identifier of the view, prestored view details for the view, wherein the view details include identifiers of the parameters included in the view and identifiers of one or more tables to which input data of the parameters included in the view are to be respectively stored; making, by the first application, a save data application programming interface (API) call to save current input data of a parameter of the view to a table from among the one or more tables, wherein an input to the save data API call includes the identifiers of the one or more tables, the identifiers of the parameters, the current input data, and old data of the parameter; comparing the current input data with the old data included in the input to the save data API call; based on the current input data and the old data being different according to the comparing, storing the current input data in the table; and based on the current input data and the old data being different according to the comparing, creating history information of the current input data and storing the history information in a history table.

The method may further include: outputting a view configuration screen for modifying a configuration of the parameters of the view; receiving a user input to modify a history setting of the parameter so as to enable a saving of a history of the parameter; and storing the history setting in the view details.

The view details may further include a history setting for the parameter indicating whether an input history of the parameter is to be saved; and the creating the history information of the current input data may include creating the history information based on a determination that the history setting for the parameter indicates that the input history of the parameter is to be saved.

The history information may include an identifier of the parameter, the old data, the current input data of the parameter, and a current date.

The method may further include outputting a history user interface for the instance of the view, the history user interface providing a list of history information for the parameters of the instance of the view.

The input to the save data API may include, for each of the one or more tables, a first JSON string including identifiers of the parameters and current data values for the parameters, and a second JSON string including identifiers of the parameters and old data values for the parameters.

The storing the current input data may include: obtaining, based on the identifiers of the one or more tables, information of a second application, associated with the table, from resource information pre-registered in the first application, the resource information mapping applications to tables respectively associated with the applications; sending, based on the obtained information of the second application, a request to the second application to store the current input data to the table associated with the second application; and storing, by the second application, the current input data to the table, wherein the save data API is generic across the plurality of tables.

The method may further include obtaining identifiers of one or more primary keys corresponding to the view, wherein the input to the save data API may further include the identifiers of the one or more primary keys, and one or more primary key values corresponding to the instance of the view.

The outputting the instance of the view may include: making, by the first application, a get data API call for fetching old data of the parameters included in the view configured by the first application, wherein an input of the get data API call may include a view identifier corresponding to the view; obtaining, in response to the get data API call, the view details for the view; sending, based on the obtained view details, a request to a second application for the old data of the parameter, among the parameters, stored in the table associated with the second application, from among the one or more tables; and receiving and displaying, on the instance of the view, the requested old data, wherein the get data API is generic across a plurality of views including a plurality of different parameters.

According to embodiments, a non-transitory computer-readable recording medium has recorded thereon instructions executable by at least one processor to perform a method for saving history information of input data to parameters included in a view, the method including: outputting an instance of the view; obtaining, by a first application based on an identifier of the view, prestored view details for the view, wherein the view details include identifiers of the parameters included in the view and identifiers of one or more tables to which input data of the parameters included in the view are to be respectively stored; making, by the first application, a save data application programming interface (API) call to save current input data of a parameter of the view to a table from among the one or more tables, wherein an input to the save data API call includes the identifiers of the one or more tables, the identifiers of the parameters, the current input data, and old data of the parameter; comparing the current input data with the old data included in the input to the save data API call; based on the current input data and the old data being different according to the comparing, storing the current input data in the table; and based on the current input data and the old data being different according to the comparing, creating history information of the current input data and storing the history information in a history table.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIGS. 4A and 4B illustrate an example of an input to a save data API in accordance with an embodiment;

FIGS. 6A and 6B illustrate examples of a view configuration screen, according to an embodiment;

FIGS. 7A and 7B illustrate examples of a history user interface for an instance of a view, according to an embodiment;

DETAILED DESCRIPTION

Figure 1:
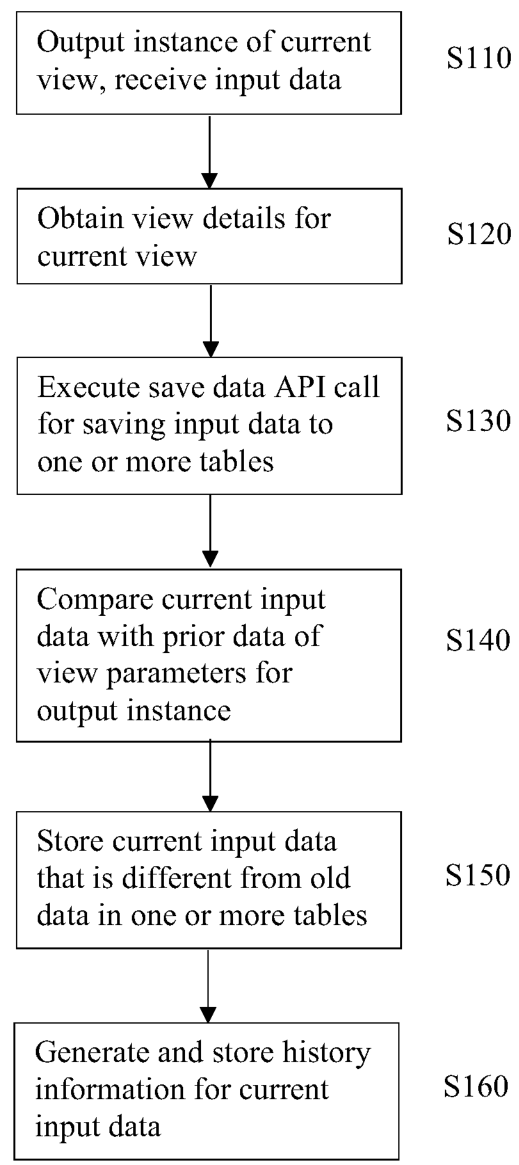
FIG. 1 illustrates a flowchart of a method for saving history information of input data to parameters included in a view.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a generic history capturing function (e.g., a generic history capturing application programming interface (API) or execution logic) is integrated into a data viewing application (e.g., the above-described related art view building application or view user interface (UI)) to save history information of input data input to a view UI. As a result, the same generic function may be used to save history data for any of plural views and for any configuration or modification of a view, thereby eliminating the required development and attendant user inconvenience and time to configure views and mechanisms by which views fetch and display resource data.

Example embodiments of the present disclosure provide a method and system that executes a generic function to retrieve view details from a view configuration details table or database, and executes a generic history capturing function based on the retrieved view details. As a result, a history capturing function may be dynamically configured and vary from one view to another without requiring multiple API creation and integration into views, thereby minimizing code complexity, development time, and user inconvenience.

FIG. 1 illustrates a flowchart of a method 100 for saving history information of input data to parameters included in a view. The method 100 of FIG. 1 may be performed by at least one processor executing instructions stored in at least one memory.

Referring to FIG. 1, at operation S110, an instance of a current view is output on a first application. The current view may be a view currently output by the first application. Each instance of the view may receive input data to update an existing record of input data corresponding to the view or to generate a new record corresponding to the view in one or more resources (e.g., backend database tables). In the former case, the outputting of the instance of the view fetches previously input and stored resource data (i.e., old data) for parameters of the view from one or more backend resources (e.g., database tables), and outputs the instance with the old data. A user can then modify the values for any of the parameters and the current data (i.e., new values) will replace the old values in the backend resources.

According to an embodiment, the first application (e.g., view building application) may be an application for configuring (e.g., building) and/or viewing different views for one or more other applications (e.g., one or more other applications integrated with or into the first application). Alternatively, the first application may be a view UI integrated into the one or more other applications (e.g., as a microservice). The one or more other applications may be applications installed and deployed in an application platform, such as a cloud-based application platform for an enterprise or business. The one or more other applications and/or the first application may be deployed as containerized or microservices-based applications.

Each view configured by the first application may correspond to a screen, form, user interface, or page through which data may be input to respective parameters (i.e., data fields such as Name, Gender, Age, Address, Equipment Information, etc.) of the view and stored in one or more databases or tables of (or associated with) the one or more other applications, and/or data may be fetched from the one or more databases or tables and output for display on respective parameters of the view. The first application allows a user to configure (e.g., generate or modify) a view by selecting the parameters to be included in the view, from among parameters previously registered in the first application and corresponding to backend resource fields (e.g., table columns) of the one or more other applications. For example, the previously-registered parameters may be listed or otherwise displayed for selection in a view configuration screen of the first application, and dragged and dropped onto a view being configured.

Further, the first application allows a user to load a previously-generated instance of a view and modify the values input to each parameter, as described above. The previously-generated instance of a view may be output by a generic get data API call, such as described in PCT/US2022/036435, incorporated herein by reference in its entirety.

At operation S120, the first application obtains view details for the current view. The view details may be obtained from a database or table in which plural sets of view details are respectively mapped to corresponding view identifiers. In this case, the view details may be obtained based on a view identifier of the current view. The view details include identifiers of the parameters included in the view and identifiers of one or more tables in which the resource data of the parameters are respectively to be stored. The view details are generated or updated and stored based on a configuration of a view by a user (selections of parameters and settings for the parameters), via the view building application.

The view details may also include primary key information (e.g., identifiers of one or more primary keys) corresponding to the current view. Here, the primary keys may vary from one application (i.e., application to which the view corresponds or to which a backend table for storing parameter data of the view corresponds) to another, or may vary from one backend table to another. The primary keys may correspond to parameters of the view (e.g., an input data field), to thereby distinguish records (or data objects) corresponding to the view from each other. For example, if a view is for inputting employee information, a primary key may be an employee ID field that is unique to each instance or employee record generated from/input to the view.

According to an embodiment, the view details further include a history setting for each parameter (or for at least one parameter) of the view. The history setting is configurable by a user via the first application to selectively configure whether history information for a parameter is to be captured and maintained or not. As a result, a history capturing function in accordance with embodiments is dynamic and easily configurable by a user at run time, without requiring hardcoding, customized APIs or logic, or any other development efforts.

As will be set forth with reference to FIG. 2 below, the view details may be obtained by a generic API call (e.g., get data API call) in accordance with one or more embodiments. That is, the view details may be obtained pursuant to the output of the view in operation S110. The API call may be executed by backend logic of the first application in response to a triggering event (e.g., loading the view, receiving a user request to save view data, etc.). The view details may be obtained in response to the instance of the view being loaded or output for display, or may be obtained thereafter, e.g., in response to a request to save the input data of the view. It is understood that operation S120 may be performed as part of operation S110 or subsequent to operation S110.

At operation S130, the first application makes or executes a save data API call for saving the input data to one or more tables. According to an embodiment, the save data API is generic across a plurality of views, and across a plurality of tables. The same save data API may be called once to save input data into a plurality of corresponding backend tables. As a result, multiple API creation and integration and the attendant code complexity can be eliminated.

An input to the save data API call includes the identifiers of the one or more tables and the identifiers of the parameters, obtained from the view details. The input to the save data API further includes the current input data as well as the old data for each parameter. The old data may be previously retrieved in operation S110 via a generic get data API call, as set forth above, or may be retrieved again by the generic get data API call upon input of a request to save the input data of the output instance of the current view.

By way of example, the input to the save data API call may be include at least one JavaScript Object Notation (JSON) string. Further, the input may include a plurality of JSON objects, with each object corresponding to a respective table and containing a first JSON string of the identifiers of the parameters associated with that table (e.g., associated with columns of that table, with each parameter having its data stored in a corresponding column) as well as the current input data of the parameters associated with that table (i.e., the input data to be stored in that table), and a second JSON string of the identifiers of the parameters as well as the old data of the parameters (i.e., the data previously fetched from the backend table when outputting the instance of the view).

The save data API may be executed in response to a user input to save the resource data. Alternatively (or additionally), the save data API may be automatically executed, e.g., when the view UI is closed or existed, periodically, etc.

At operation S140, the first application compares the current input data with the old data included in the input to the save data API call. In accordance with an embodiment, the comparing may be performed by backend execution logic or a generic backend API that receives the current and old data input to the save data API call and compares them for each parameter. The backend logic or API may perform the comparison for all of the parameters (e.g., to determine which of the parameters to send for updating/storing in the corresponding table) or for only those parameters for which a history setting indicates that history information for that parameter is to be saved. As set forth above, the history setting is obtained from the view details. The backend logic or API may be called by the save data API for each of the parameters (i.e., iteratively for each parameter). The input to the backend logic or API may be the old data and the current input data for a parameter, and the comparison may be repeated sequentially for each parameter.

In operation S140, the old data and the current input data are obtained from the input to the save data API call. For example, where the input is in a JSON format (as described above and shown in FIGS. 4A and 4B), the input is parsed and the old and current parameter values are obtained for comparison.

At operation S150, the current input data that is different from the old data is stored in corresponding one or more tables. By performing the storing based on the comparison, only that data that is to be updated is sent for storage, thereby conserving system resources (communication bandwidth for sending the data, processing load, etc.). According to another embodiment, all of the current input data may be sent for storage, irrespective of whether the data is updated. As will be explained in further detail below with reference to FIG. 3, the input data is stored in one or more tables associated with one or more other applications. To this end, the first application (or save data API) may request the one or more other applications to store corresponding data in tables associated therewith, based on resource information (i.e., application information) retrieved for the other application(s).

At operation S160, based on the current input data being different from the old data according to the comparing, history information of the current input data is generated and stored in a history table corresponding to the current view (or the output instance of the current view). According to an embodiment, the history information is stored for only those parameters for which the history setting is configured to maintain a history, as set forth above. The history information includes at least one of an identifier of the parameter, the old data, the current input data of the parameter, a current date, an identifier of a user (or user ID) that modified the data of the parameter, etc. The generating and storing of the history information may be implemented by execution logic or an API call by the save data API or the first application. The history information may be saved to a history table mapped to a primary key value of the current view.

The history information may be later retrieved and output for display to a user via a history information UI. The retrieval may be based on the primary key value of the output instance of the current view, where the primary key(s) of the current view may be stored and retrieved by generic execution logic to/from the view details (with an identifier of the current view being an input), and the primary key value(s) for an output instance of the current view may be retrieved by a generic retrieval function, e.g., the get data API call. As the retrieval and output of the history information is based on generic execution calls to obtain information stored in tables, no customized APIs or special hardcoding is required to integrate the history viewing function for a particular view into an application.

According to embodiments, because the view details (including the history settings) are stored in a table and loaded via a generic API call and because the storing of the view data is performed via a generic save API call, the history capturing function can be generically incorporated into any view. Customized APIs or coding is not required, as all of the information needed to determine which parameters are to have their history stored and for storing the history of those parameters is obtained via generic logic from backend tables in which this information is maintained.

Figure 2:
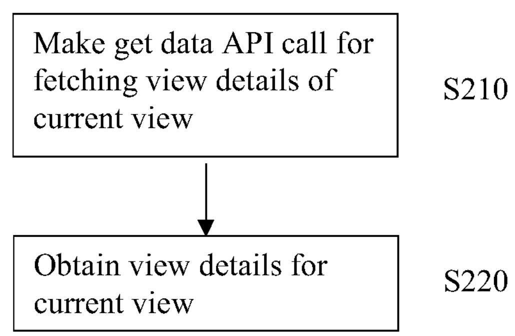
FIG. 2 illustrates a flowchart of a method for obtaining view details of a view, according to an embodiment.

FIG. 2 illustrates a flowchart of a method 200 for obtaining view details of a view, according to an embodiment. The method 200 of FIG. 2 may be performed by at least one processor executing instructions stored in at least one memory. For example, the method 200 of FIG. 2 may correspond to operation S120 of FIG. 1.

Referring to FIG. 2, at operation S210, an application (e.g., the first application described above) makes or executes a get data API call for fetching view details of parameters included in a view (i.e., current view). The current view may be a view that is currently output, and the get data API may be integrated into the first application (e.g., view UI). The get data API call may receive as an input at least a view identifier corresponding to the current view, though it is understood that other embodiments are not limited thereto. For example, the get data API call may also receive as an input an application identifier that identifies an application for which the view is configured. The input to and execution of the get data API call may be implemented by execution logic included the first application and executed in response to a user input requesting saving of input data to the current view and/or in response to a loading and outputting of the current view.

At operation S220, view details for the view are obtained in response to the get data API call. For example, the get data API call may request and receive view details from a database or table (e.g., JSON database or table), where said view details correspond to or are mapped to a view identifier. To this end, a view details storage (e.g., JSON database, table(s), resource file, etc.) may map views to corresponding parameters respectively included in the views as configured via a view building application. That is, based on a view being built or modified with various parameters in the view building application, the view building application stores those parameters in association with an identifier of the view (e.g., view name, index value, etc.) in the view details storage. Thus, based on the view identifier input to the get data API call, the corresponding view details for the current view are obtained from the view details storage.

According to an embodiment, the view details include identifiers of the parameters included in the current view and a history setting for each of these parameters. Alternatively, the history setting may only be stored if configured to store or maintain history information for that parameter (e.g., if no history information or indicator is included for a parameter, it may be assumed that history information is not to be maintained for that parameter). The view details may further include identifiers of one or more tables in which the parameters are respectively included, i.e., as columns (though it is understood that, in one or more other embodiments, the mapping of parameters to tables may be separately stored in a different table or storage and retrieved via separate logic). TABLE 1 below illustrates an example of view details mapped to a current view in the view details storage and obtained based on the get data API call:

TABLE 1

| | | |
|---|---|---|
| Parameter 1 | Table 1 | Store History Information |
| Parameter 2 | Table 1 | Do Not Store History Information |
| Parameter 3 | Table 2 | Store History Information |
| Parameter 4 | Table 2 | Store History Information |
| Parameter 5 | Table 3 | Do Not Store History Information |
| Parameter 6 | Table 3 | Do Not Store History Information |

As can be seen in the example of TABLE 1 above, the current view includes six parameters from three different tables. For parameters 1, 3, and 4, the history setting is configured so as to store history information thereof. Conversely, for parameters 2, 5, and 6, the history setting is configured so as to not store the history information thereof. According to an embodiment, the view details may also identify at least one primary key for each Table. The view details are retrieved based on the generic get data API call to which the view name of the current view is input. Because the view details storage (e.g., database, table(s), resource file, etc.) stores the various parameters configured or included in each view, custom APIs for fetching view details (including history information) for a particular view or modification of the view are not required. Instead, the generic get data API in accordance with example embodiments may be universally used to retrieve view details for each view from the view details storage.

For example, if the current view per the example of TABLE 2 is later modified to include an additional parameter from another table, e.g., Parameter 7 from Table 4 as shown in TABLE 2 below, and to change the history setting for Parameter 1, then this update would be reflected in the view details for the current view as stored in the view details storage and would be retrieved by the generic get data API call without any API development or customizations:

TABLE 2

| | | |
|---|---|---|
| Parameter 1 | Table 1 | Do Not Store History Information |
| Parameter 2 | Table 1 | Do Not Store History Information |
| Parameter 3 | Table 2 | Store History Information |
| Parameter 4 | Table 2 | Store History Information |
| Parameter 5 | Table 3 | Do Not Store History Information |
| Parameter 6 | Table 3 | Do Not Store History Information |
| Parameter 7 | Table 4 | Store History Information |

The obtained view details may then be used to generate an input to a save data API and to determine whether to store history information according to example embodiments. The obtained view details may also be used to obtain resource information for applications associated with the tables identified in the view details. Alternatively, the save data API may obtain the resource information using the information (e.g., table identifiers) included in the input to the save data API.

Figure 3:
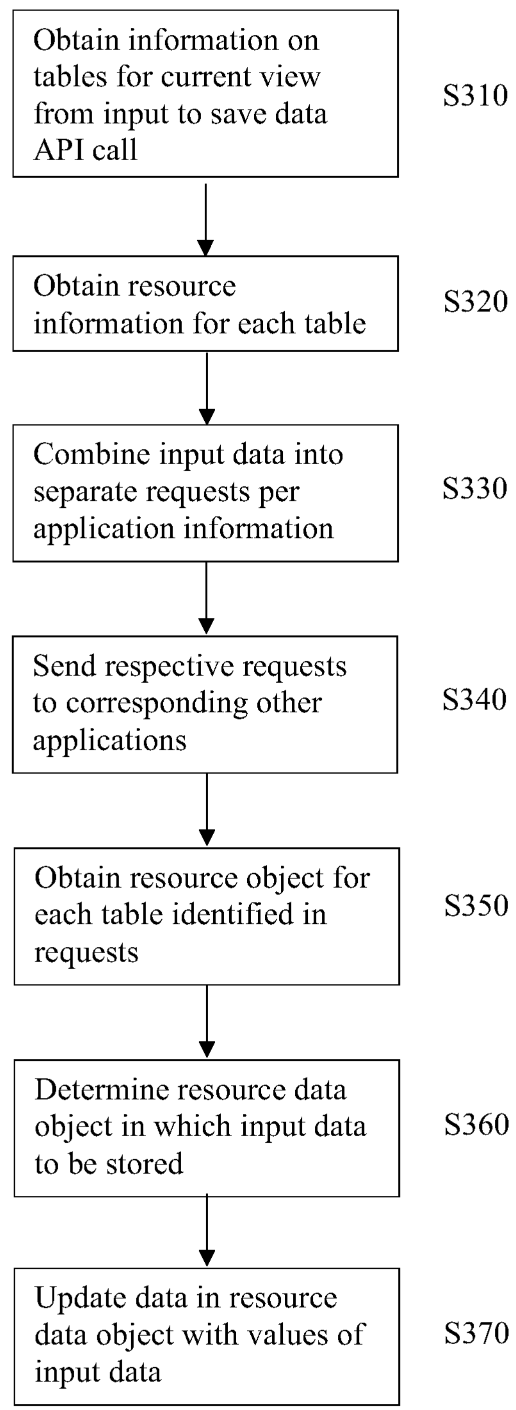
FIG. 3 illustrates a flowchart of a method 300 for saving current input data into one or more tables, according to an embodiment.

FIG. 3 illustrates a flowchart of a method 300 for saving current input data into one or more tables, according to an embodiment. The method 300 of FIG. 3 may be performed by at least one processor executing instructions stored in at least one memory. The method 300 of FIG. 3 may be performed (at least in part) by a save data API, and may correspond to operation S150 of FIG. 1. The method 300 of FIG. 3 may be performed with respect to current input data to be stored. In an embodiment, the current input data to be stored is that which is determined to be different from the old data pursuant to the comparing of operation S140 in FIG. 1. Alternatively, in another embodiment, all of the current input data may be processed for storage, even if not different from the old data.

Referring to FIG. 3, at operation S310, information on tables for a current view is obtained from the input to the save data API. In particular, identifiers of the tables included in the input to the save data API are obtained. For example, where the input is a JSON format, the input is parsed into a plurality of objects each corresponding to a different table.

At operation S320, the first application obtains, based on the identifiers of the one or more tables, resource information of at least a second application from resource information pre-registered in the first application. The resource information may include application information (e.g., at least one of application/microservice name, application/microservice path, etc.) of each application associated with or including a table(s) in which the parameters of the current view are stored.

Specifically, the first application (or the save data API) obtains resource information corresponding to parameters and/or tables identified in the view detail information for a current view from a resource information storage (e.g., database(s), table(s), resource file(s), etc.). The resource information identifies the application(s) (e.g., second application) including or associated with the table(s) in which the parameters of the current view are stored. To this end, the resource information storage maps applications to tables respectively associated with the applications. Thus, a request by the first application for the resource information includes identification information of each table corresponding to the current view (i.e., each table including a parameter included in the current view). The identification information is obtained based on the view detail information for the current view. The request may be made by backend logic of the first application, e.g., via a backend API call.

As set forth above, one or more other applications may be integrated into the first application such that views may be built for the other applications and/or such that views may be configured with parameters for inputting and/or viewing resource data stored in association with the other applications (e.g., stored in tables of or associated with the other applications). The tables included in (or associated with) each of the integrated applications may be previously registered in the first application, such as by including mapping information of the tables to their locations in the resource information storage (e.g., resource information table). Here, the locations may be the respective applications in which the tables are stored (or with which the tables are associated). For example, the resource information may be application or microservice information including at least one of an application name, a microservice name, a microservice path, etc. Thus, the resource information may be application or microservice information obtained for each table included or identified in the view details for a particular view. An example of the resource information obtained from the resource information storage for a current view in which four tables (Table 1, Table 2, Table 3, and Table 4) are identified from the view details is provided in TABLE 3 below:

TABLE 3

| | |
|---|---|
| Table 1 | Microservice 1, path1 |
| Table 2 | Microservice 2, path2 |
| Table 3 | Microservice 3, path3 |
| Table 4 | Microservice 4, path4 |

In the present embodiment, operation S320 is performed in response to or based on the save data API call. It is understood, however, that one or more other embodiments are not limited thereto, and operation S320 may be performed prior to the save data API call, with the previously-obtained resource information of the relevant applications for the current view being later provided to execution logic of the save data API call.

Referring back to FIG. 3, at operation S330, the current input data to be stored (e.g., based on the comparing of operation S140) and that belongs to the same resource information (i.e., the same application or microservice path/URL) is combined. For example, where the resource information indicates that a first set of tables (among the tables identified in the input to the save data API) are associated with (or included in) a second application or microservice and that a second set of tables (among the tables identified in the input to the save data API) are associated with a third application or microservice, the first application (or the save data API) combines the input data, parameter identifiers, and/or table identifiers corresponding to the first set of tables into a first request, and combines the input data, parameter identifiers, and/or table identifiers corresponding to the second set of tables into a second request. Each request may have a JSON format (e.g., a list of JSON strings each corresponding to a different table and including parameter identifiers and corresponding input data values), and may include one or more primary keys relevant to that request (e.g., relevant to the microservice or tables of that request).

At operation S340, the respective requests are sent to the corresponding other applications or microservices. Taking the example described above, the first request may be submitted as an input to an API of the second application, and the second request may be submitted as an input to an API of the third application. All or some of operations S310 through S340 may be performed by execution logic of the save data API.

At operation S350, the other application or microservice processes the request to obtain a resource object for each table identified or included in the request. For example, where the request is in a JSON format as described above, the JSON string for each table is parsed or converted to a JAVA object. In an embodiment, the API of the other application may create a JAVA resource (or table) object by casting the request input to a resource JAVA class.

At operation S360, a value of the primary key included in the resource object is checked against the corresponding table, to determine a data object (or record) (e.g., a row in the table where each row corresponds to a different record or instance for the parameters thereof) in which the input data is to be stored.

At operation S370, the data of that object is overridden with the values of the input data included in the resource object and stored in the table. That is, the new input data to the view override or replace the previous data or inputs for that record. By way of example, the existing data object is fetched from the table using a generic search method of that table (with the primary key value as an input). A JAVA reflection API may then be used to override the values (resource data) in the old data object with the new values included in the JSON string (i.e., in the resource object). The new data object is then passed to a service layer create method for the resource (table).

Operations S350 through S370 are performed by each of the other applications identified in the resource information of operation S320, e.g., the APIs of each of the other applications called in operation S340. Further, operations S360 through S370 are iterated or repeated for each resource object (table) included in the request (i.e., for which input data is to be stored by the other application). Based on completion of the storing, each of the other applications (e.g., APIs of the other applications/microservices) may return a response to the first application (or the save data API) indicating completion of the storage of the view input data. The save data API may combine the responses and confirm completion, and return a single response to the first application. The first application (e.g., view UI) may then output a message to a user confirming that the input data has been stored.

FIGS. 4A and 4B illustrate an example of an input to a save data API in accordance with an embodiment. In the example of FIGS. 4A and 4B, the input to the save data API is in a JSON format with different JSON strings corresponding to different tables (i.e., each strings includes parameter information for the parameters of a single table).

Referring to FIGS. 4A and 4B, the input includes a first list 410 (e.g., JSON strings) of current input data of parameters, and a second list 420 (e.g., JSON strings) of old input data of the parameters.

The input to the save data API further includes an "entityRelation" object 430 in which primary keys and their values are set forth. The primary keys are used to uniquely identify the record for the current input data. That is, the primary keys are used to identify resource mapping to create and/or update resource data (i.e., the parameter data saved in the resources/tables). In an embodiment, each table may be understood as a table of rows and columns, with the columns corresponding to respective parameters, and each row providing a different record or object of data for those parameters. Thus, each row may correspond to a different record or instance of the view. The record is uniquely identified by a primary key value, e.g., a column may correspond to a primary key and the values in that column are unique to each row (such as a project number, a site identifier, a project task, and a task name).

As set forth above, the identifiers of the tables, parameters, and primary keys may be obtained by the execution logic of the first application from the view details of the current view. According to an embodiment, the view details may be obtained by executing a generic get data API.

Figure 5:
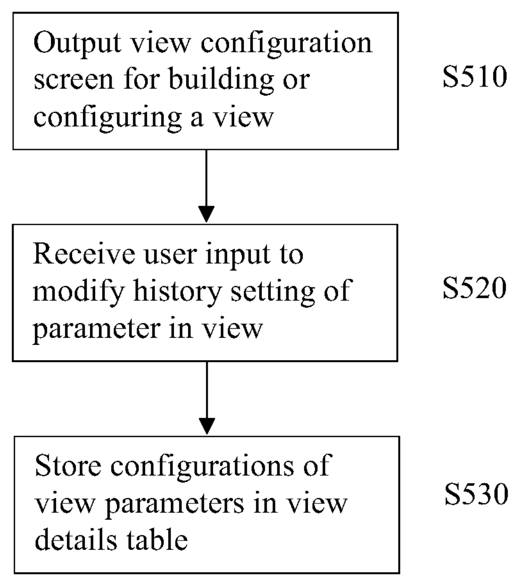
FIG. 5 illustrates a flowchart of a method for configuring a history setting for a parameter of a view, according to an embodiment.
Figure 6B:
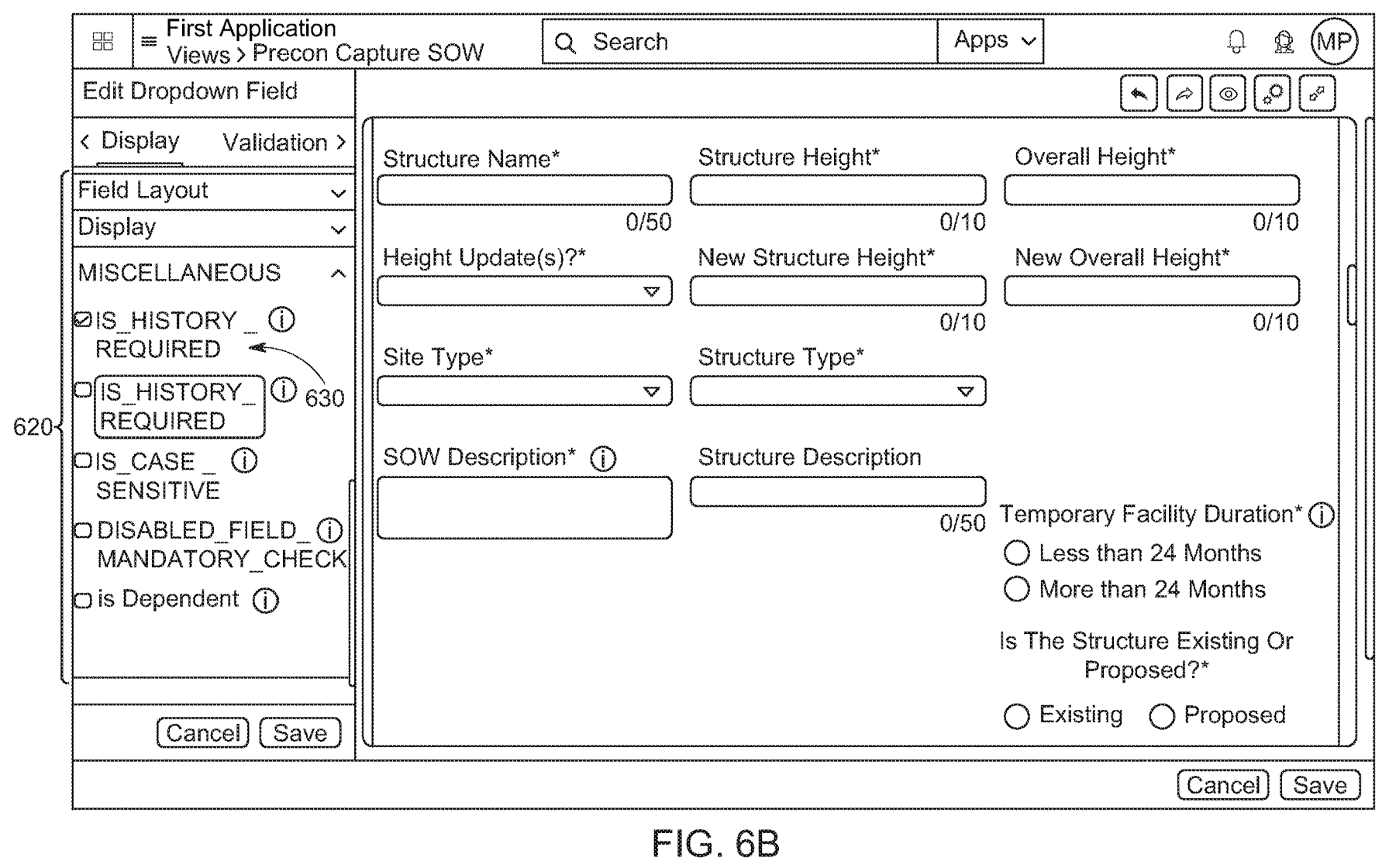

FIG. 5 illustrates a flowchart of a method 500 for configuring a history setting for a parameter of a view, according to an embodiment. The method 500 of FIG. 5 may be performed by at least one processor executing instructions stored in at least one memory. FIGS. 6A and 6B illustrate examples of a view configuration screen in accordance with an embodiment.

Referring to FIG. 5, at operation S510, a view configuration screen for modifying a configuration of the parameters of a view is output. An example of the view configuration screen is shown in FIG. 6A. The view configuration screen may be a screen of a view building application as described above, through which different views may be generated, modified, configured, etc.

At operation S520, a user input to modify a history setting of a parameter is received. For example, referring to FIG. 6A, a user may select an icon 610 for configuring a corresponding parameter on the view configuration screen. In response, a menu 620 for editing a configuration of the parameter is displayed, and a user can select to enable a history setting 630 via the menu 620, as shown in FIG. 6B.

At operation S530, the configurations for the parameters of the view, including the history setting received in operation S520, are stored in the view details for that view. Accordingly, a history capturing function may be dynamically configured and modified by a user with respect to each parameter of a view at runtime, without requiring any API customizations or further coding/development time and cost.

As set forth above, the history information for parameters of a view that are configured so as to maintain a history thereof may be later retrieved and output for display to a user via a history information UI (or history UI). FIGS. 7A and 7B illustrate examples of a history UI for a particular instance of a view, according to an embodiment.

Referring to FIG. 7A, history information for parameters of an instance of a view is displayed. As can be seen, for the parameter "Height Update(s)," the history shows a value "Yes-Decrease in Height" being added previously, and then being updated subsequently to "No."

In accordance with example embodiments, history information may also be recorded for special fields included in a view, such as a data grid field, a document attachment field, etc. For example, a document may be uploaded by a user and attached to an instance of a view. In such a case, history information for the file upload may be captured, stored, and later displayed in the history information UI, as shown in FIG. 7B. Referring to FIG. 7B, a file "MMcalltest9314_Audit_List.pdf" is replaced by a different file "Site Activity History (20).xlsx," where such replacement is recorded as two entries in the history information, i.e., a delete of the prior file and an add of the new file.

Figure 8:
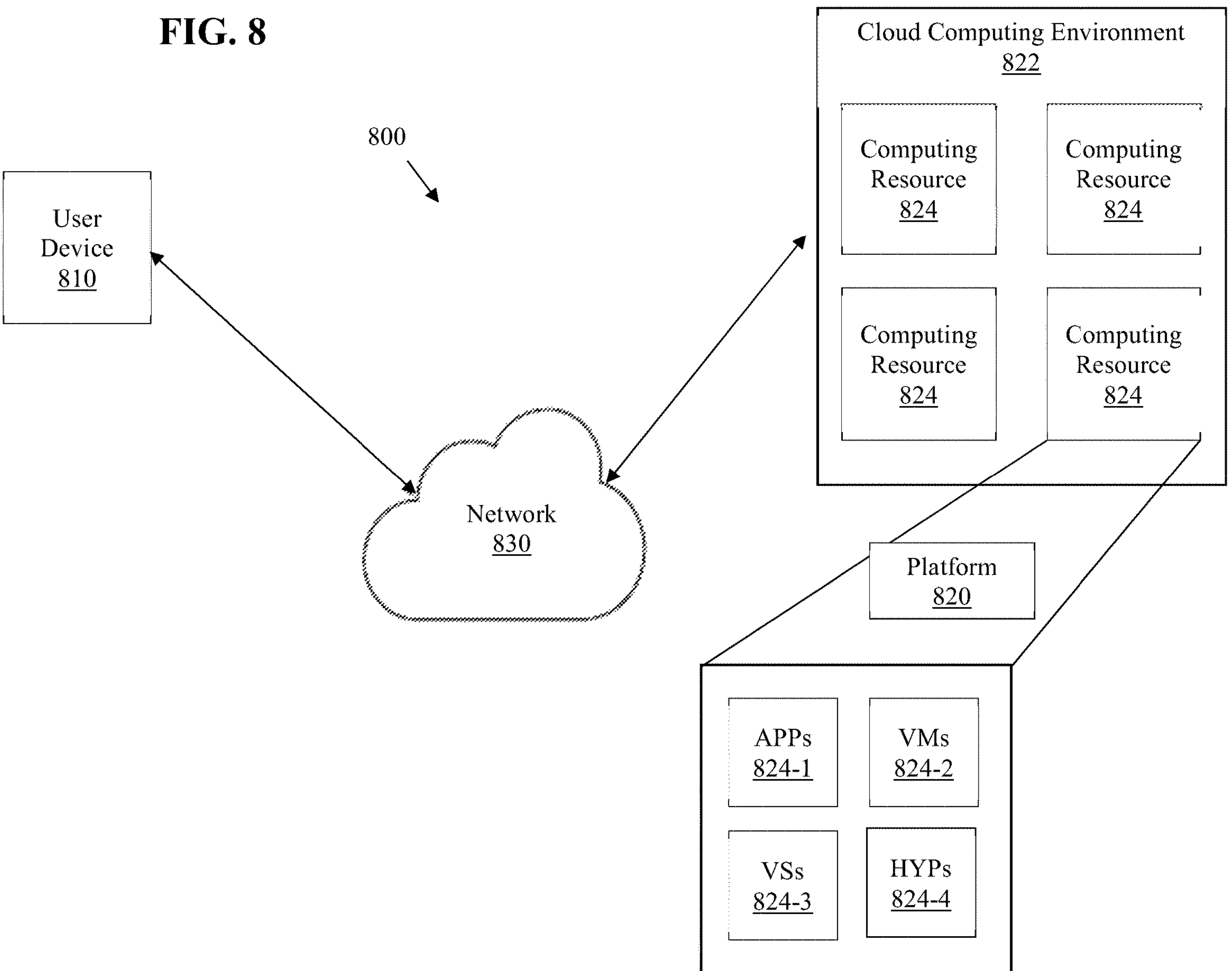
FIG. 8 is a diagram of an example environment in which systems and/or methods, described herein, may be implemented.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIGS. 1 through 7 above may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc., services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
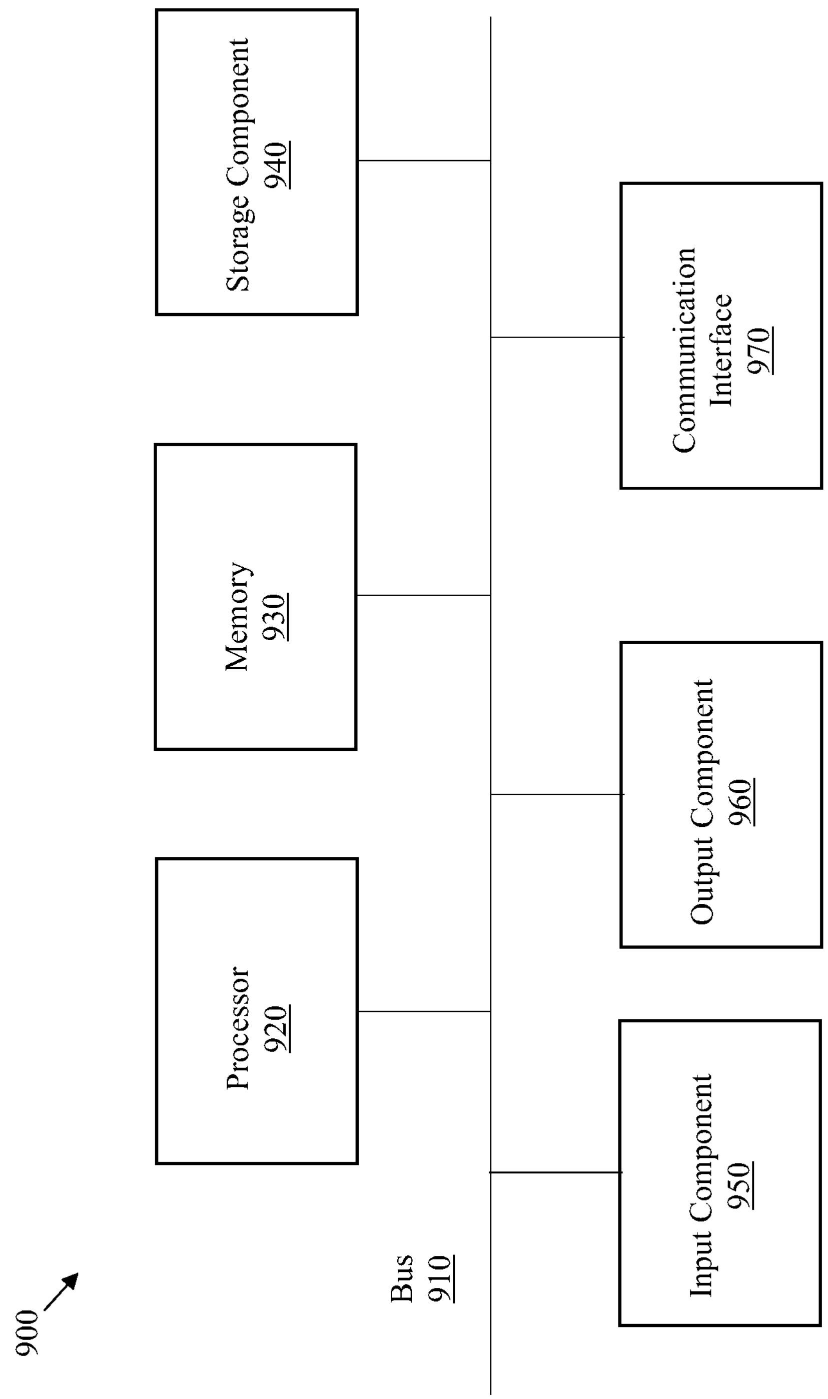
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In embodiments, any one of the operations or processes of FIGS. 1 through 7B may be implemented by or using any one of the elements illustrated in FIGS. 8 and 9.

In accordance with example embodiments, a generic history capturing function is integrated into a view UI and is dynamically configurable to maintain history information for input data to parameters of the UI. The generic history capturing function utilizes generic execution logic and API calls with inputs that are obtained from resource tables. As a result, the same dynamic functionality can be integrated into any of plural views without requiring any customized coding or APIs, thereby eliminating the required development and attendant user inconvenience and time to configure views and mechanisms by which views fetch and display resource data.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for saving history information of input data to parameters included in a view, the system comprising:
at least one memory storing instructions; and
at least one processor configured to execute the instructions to:
output, by a first application, an instance of the view;
obtain, by the first application based on an identifier of the view, prestored view details for the view, wherein the view details comprise identifiers of the parameters included in the view and identifiers of one or more tables to which input data of the parameters included in the view are to be respectively stored;
make, by the first application, a save data application programming interface (API) call to save current input data of a parameter of the view to a table from among the one or more tables, wherein an input to the save data API call comprises the identifiers of the one or more tables, the identifiers of the parameters, the current input data, and old data of the parameter;
compare the current input data with the old data included in the input to the save data API call;
based on the current input data and the old data being different according to the comparing, store the current input data in the table; and
based on the current input data and the old data being different according to the comparing, create history information of the current input data and store the history information in a history table.

2. The system as claimed in claim 1, wherein the at least one processor is further configured to execute the instructions to:
output a view configuration screen for modifying a configuration of the parameters of the view;
receive a user input to modify a history setting of the parameter so as to enable a saving of a history of the parameter; and
store the history setting in the view details.

3. The system as claimed in claim 1, wherein:
the view details further comprise a history setting for the parameter indicating whether an input history of the parameter is to be saved; and
the at least one processor is further configured to execute the instructions to create the history information based on a determination that the history setting for the parameter indicates that the input history of the parameter is to be saved.

4. The system as claimed in claim 1, wherein the history information comprises an identifier of the parameter, the old data, the current input data of the parameter, and a current date.

5. The system as claimed in claim 1, the at least one processor is further configured to execute the instructions to output a history user interface for the instance of the view, the history user interface providing a list of history information for the parameters of the instance of the view.

6. The system as claimed in claim 1, wherein the input to the save data API comprises, for each of the one or more tables, a first JSON string including identifiers of the parameters and current data values for the parameters, and a second JSON string including identifiers of the parameters and old data values for the parameters.

7. The system as claimed in claim 1, wherein the at least one processor is further configured to execute the instructions to:
obtain, based on the identifiers of the one or more tables, information of a second application, associated with the table, from resource information pre-registered in the first application, the resource information mapping applications to tables respectively associated with the applications;
send, based on the obtained information of the second application, a request to the second application to store the current input data to the table associated with the second application; and
store, by the second application, the current input data to the table,
wherein the save data API is generic across the plurality of tables.

8. The system as claimed in claim 7, wherein:
the at least one processor is further configured to execute the instructions to obtain identifiers of one or more primary keys corresponding to the view; and
the input to the save data API further comprises the identifiers of the one or more primary keys, and one or more primary key values corresponding to the instance of the view.

9. The system as claimed in claim 1, wherein the view details are obtained from a table that maps views to corresponding parameters respectively included in the views.

10. The system as claimed in claim 1, wherein the at least one processor is further configured to execute the instructions to:
make, by the first application, a get data API call for fetching old data of the parameters included in the view configured by the first application, wherein an input of the get data API call comprises a view identifier corresponding to the view;
obtain, in response to the get data API call, the view details for the view;
send, based on the obtained view details, a request to a second application for the old data of the parameter, among the parameters, stored in the table associated with the second application, from among the one or more tables; and
receive and display, on the instance of the view, the requested old data,
wherein the get data API is generic across a plurality of views including a plurality of different parameters.

11. A method, performed by at least one processor, for saving history information of input data to parameters included in a view, the method comprising:
outputting an instance of the view;

obtaining, by a first application based on an identifier of the view, prestored view details for the view, wherein the view details comprise identifiers of the parameters included in the view and identifiers of one or more tables to which input data of the parameters included in the view are to be respectively stored;

making, by the first application, a save data application programming interface (API) call to save current input data of a parameter of the view to a table from among the one or more tables, wherein an input to the save data API call comprises the identifiers of the one or more tables, the identifiers of the parameters, the current input data, and old data of the parameter;

comparing the current input data with the old data included in the input to the save data API call;

based on the current input data and the old data being different according to the comparing, storing the current input data in the table; and based on the current input data and the old data being different according to the comparing, creating history information of the current input data and storing the history information in a history table.

12. The method as claimed in claim 11, further comprising:

outputting a view configuration screen for modifying a configuration of the parameters of the view;

receiving a user input to modify a history setting of the parameter so as to enable a saving of a history of the parameter; and storing the history setting in the view details.

13. The method as claimed in claim 11, wherein:

the view details further comprise a history setting for the parameter indicating whether an input history of the parameter is to be saved; and the creating the history information of the current input data comprises creating the history information based on a determination that the history setting for the parameter indicates that the input history of the parameter is to be saved.

14. The method as claimed in claim 11, wherein the history information comprises an identifier of the parameter, the old data, the current input data of the parameter, and a current date.

15. The method as claimed in claim 11, further comprising outputting a history user interface for the instance of the view, the history user interface providing a list of history information for the parameters of the instance of the view.

16. The method as claimed in claim 11, wherein the input to the save data API comprises, for each of the one or more tables, a first JSON string including identifiers of the parameters and current data values for the parameters, and a second JSON string including identifiers of the parameters and old data values for the parameters.

17. The method as claimed in claim 11, wherein the storing the current input data comprises:

obtaining, based on the identifiers of the one or more tables, information of a second application, associated with the table, from resource information pre-registered in the first application, the resource information mapping applications to tables respectively associated with the applications;

sending, based on the obtained information of the second application, a request to the second application to store the current input data to the table associated with the second application; and storing, by the second application, the current input data to the table, wherein the save data API is generic across the plurality of tables.

18. The method as claimed in claim 17, further comprising:

obtaining identifiers of one or more primary keys corresponding to the view, wherein the input to the save data API further comprises the identifiers of the one or more primary keys, and one or more primary key values corresponding to the instance of the view.

19. The method as claimed in claim 11, wherein the outputting the instance of the view comprises:

making, by the first application, a get data API call for fetching old data of the parameters included in the view configured by the first application, wherein an input of the get data API call comprises a view identifier corresponding to the view;

obtaining, in response to the get data API call, the view details for the view;

sending, based on the obtained view details, a request to a second application for the old data of the parameter, among the parameters, stored in the table associated with the second application, from among the one or more tables; and receiving and displaying, on the instance of the view, the requested old data, wherein the get data API is generic across a plurality of views including a plurality of different parameters.

20. A non-transitory computer-readable recording medium having recorded thereon instructions executable by at least one processor to perform a method for saving history information of input data to parameters included in a view, the method comprising:

outputting an instance of the view;

obtaining, by a first application based on an identifier of the view, prestored view details for the view, wherein the view details comprise identifiers of the parameters included in the view and identifiers of one or more tables to which input data of the parameters included in the view are to be respectively stored;

making, by the first application, a save data application programming interface (API) call to save current input data of a parameter of the view to a table from among the one or more tables, wherein an input to the save data API call comprises the identifiers of the one or more tables, the identifiers of the parameters, the current input data, and old data of the parameter;

comparing the current input data with the old data included in the input to the save data API call;

based on the current input data and the old data being different according to the comparing, storing the current input data in the table; and based on the current input data and the old data being different according to the comparing, creating history information of the current input data and storing the history information in a history table.

* * * * *